United States Patent Office 3,286,952
Patented Nov. 22, 1966

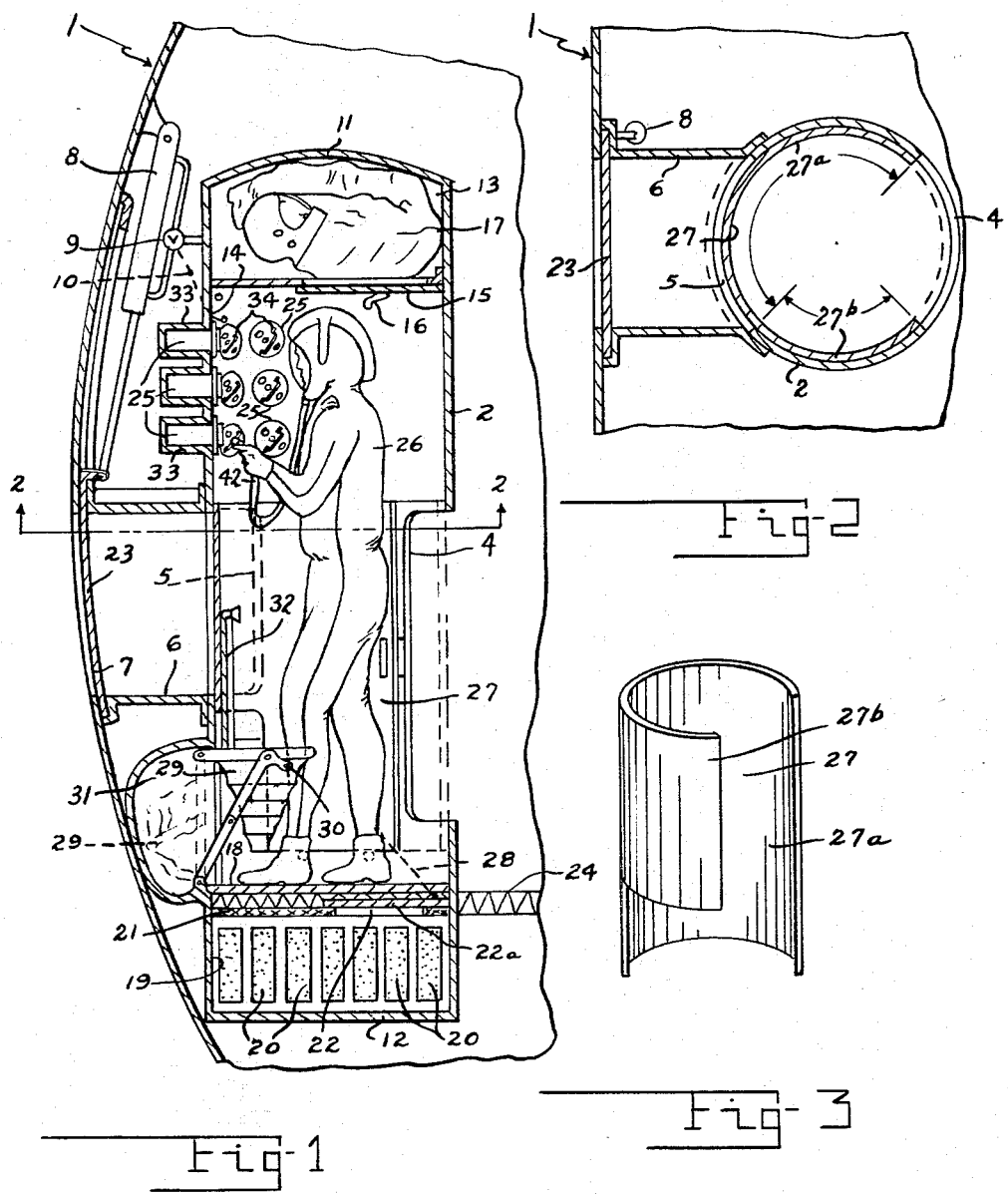

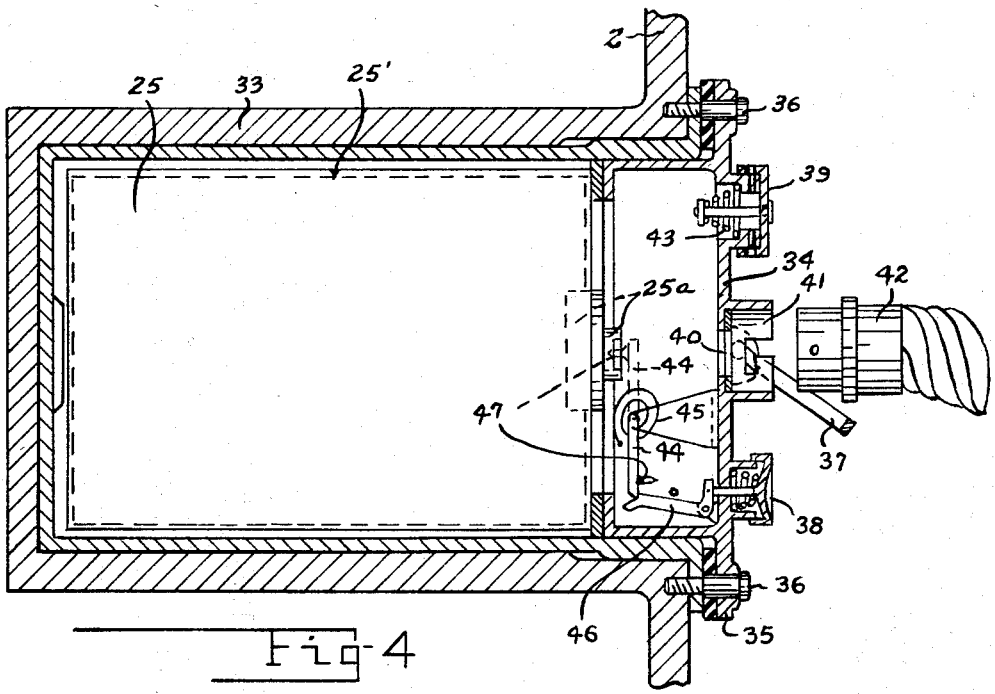
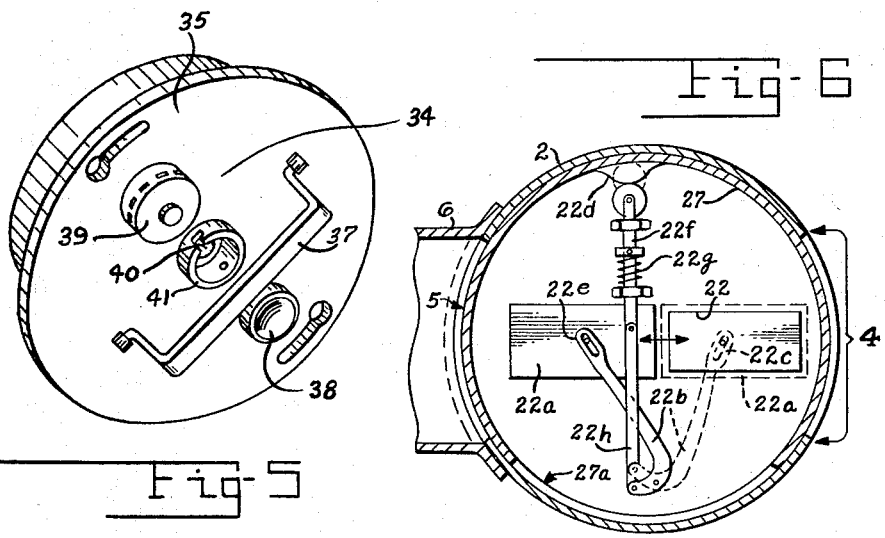

3,286,952
COMBINED EMERGENCY COMPRESSION TUBE AND AIR LOCK WITH LIFE SUSTAINING SYSTEM FOR SPACE VESSELS
Henry W. Seeler, Dayton, Ohio, assignor to the United States of America as represented by the Secretary of the Air Force
Filed Apr. 30, 1964, Ser. No. 364,037
4 Claims. (Cl. 244—1)

The invention described herein may be manufactured and used by or for the United States Government for governmental purposes without the payment to me of any royalty thereon.

This invention comprises a complete life sustaining and rescue system designed for the interior of outer space vessels or capsules which may be used when or after the conventional life support system in a space vessel has failed, or is out of operation due to "cabin" decompression, having for an object the provision of a one man compression tube or chamber within the space vessel which can also be used as an "air lock" to permit personnel within the space vessel to change from a partial pressure to a full pressure suit, and also to leave the vessel into the exterior substantially zero pressure environment without disturbing the conventional life support system within the vessel whereby no "cabin" pressure wil be lost from the interior of the space vessel for the purpose of pressurizing the compression tube or chamber after the same has been vented to outer space and closed.

A further object of the invention is the provision of an emergency personnel receiving compression tube or chamber forming a permanent fixture within the space vessel or capsule having a closable access opening therein opening into the space vehicle, and a complete independent life sustaining system therein.

A further object is the provision of an emergency oxygen supply and $CO_2$ absorbent equipment within the tube for an occupant entering the tube, operable when the access opening is closed.

A further object includes the provision of an emergency compression tube fixed within a space vessel having an access opening therein for personnel between the interior of the tube and the interior of the vessel, together with a second access opening between the interior of the tube and the exterior of the vessel, to permit an astronaut to leave the vessel, and closure means for selectively closing one, or the other, or both, of said access openings, together with $CO_2$ absorbent and oxygen generating means within said tube, and means operable by movement of said closure means for closing said access openings for rendering said $CO_2$ absorbent and oxygen supply means operable within said tube to provide a life sustaining environment in said tube.

A further object is the provision of a plurality of separate independent oxygen generating units arranged for communciation with the interior of said tube and means selectively operable by personnel entering the tube for initiating said oxygen generating units into operation to supply oxygen into said tube to pressurize the interior thereof to a life sustaining pressure, when the interior of the vessel exteriorly of the tube becomes decompressed.

A further object is the provision of a closed compression tube fixed within a space vessel having a personnel access opening therein from the interior of the vessel, together with a battery of $CO_2$ asborbent-oxygen generator units, in the bottom of the tube, with a supporting floor above said units having a vent opening therethrough and means for closing said access opening when said vent opening is opened and closing said vent opening when the access opening is open.

A further object is the provision of a life sustaining compression tube fixed within a space vessel having a closable access opening therefrom to the interior of the space vessel for receiving personnel therethrough in which the tube provides an independent and separate life sustaining environment therein, including oxygen generating means in one wall thereof adapted for connection to an astronaut's oxygen supply hose, including an oxygen pressure relief valve in said oxygen generating means for supplying excess oxygen, not needed by the astronaut, into the compression tube to provide a life sustaining environment therein, including storage facilities in the chamber for a full pressure suit which is accessible to an astronaut enclosed in the tube, whereby the astronaut may change into the full pressure suit and re-enter the interior of the space vessel in the event of decompression in the interior of the space vessel.

Other objects and advantages of the invention will become apparent from the following description and accompanying drawings in which like reference characters refer to like parts in the several figures.

FIG. 1 is a somewhat diagrammatic, vertical cross-sectional view through a space vehicle or vessel, the section also extending vertically through a combined emergency compression tube and air lock with an independent life sustaining system incorporating the invention.

FIG. 2 is a fragmentary transverse sectional view taken about on line 2—2 of FIG. 1, showing more particularly the closure means for entrance into and exit from the compression tube and air lock.

FIG. 3 is a detailed perspective view of a closure or door which may be employed, as seen in FIG. 2, to close the openings between the interior of the tube and the exterior of the space vessel, or between the interior of the tube and the interior of the space vessel.

FIG. 4 is an enlarged detailed longitudinal sectional view through one of the solid state oxygen generating candle units and the igniter means therefor, together with the receiving receptacle which is formed in the wall of the emergency compression tube.

FIG. 5 is a perspective view of one of the removable closure caps which provides the oxygen delivery opening for supplying oxygen to the interior of the compression tube, and to the interior of the astronaut's oxygen mask while in the tube or chamber, and the means for initiating the operation or ignition of one of the candles, which are retained in their chambers or receptacles in the wall of the compression tube by these caps.

FIG. 6 is a somewhat schematic, transverse sectional view illustrating one form of actuating means for the slide closure panel in the floor of the air lock tube chamber.

Referring more particularly to FIG. 1, the reference numeral 1 denotes a space vehicle or vessel while the numeral 2 indicates the improved emergency compression tube and air lock involving the invention.

The compression tube or chamber 2 is fixed within the space vehicle or vessel 1 adjacent the side wall of the vessel 3 and comprises an elongated cylindrical chamber having its longitudinal axis disposed in a normally vertical direction relative to the flight axis of the vessel 3, and is formed with two access and egress openings 4 and 5 to provide openings for personnel within the space vessel to enter the interior of the tube 2 and leave the tube through the opening 4 back into the interior of the space vessel, or leave the tube through the opening 5 and passage 6 to the exterior of the space vessel 1.

A closure panel 7 is preferably provided to close the outer end of the passage 6 which can be moved out of or into the opening at the outer end of the passage 6, but forms no particular part of the invention as it may be omitted since it is only contemplated to provide the exterior wall with the closure 7 flush with the exterior for "streamlining" purposes. This closure panel 7 may be moved into and out of the passage opening 6 by any suitable means, such as a cylinder and piston rod structure 8 under the control of a valve 9, and suitable pressure source and controlled from within the vessel 1 or within the tube 2 by a mechanical actuator schematically indicated at 10.

The top and bottom ends 11 and 12 of the tube are closed as shown, and a storage compartment is provided at 13 having a shelf like support 14 within a sliding closure panel 15 adapted to be slid back by a handle 16 for gaining access to this compartment 13. A full pressure suit or suits 17 may be stored in the compartment 13 so that, if necessary, an astronaut may enter and close the tube 2 and then, after changing to the full pressure suit, either re-enter the interior of the space craft through the door opening 4, or leave for the exterior of the space vessel through the door opening 5 and passage 6.

A supporting floor 18 is upwardly spaced from the bottom 12 to provide a lower chamber 19 containing a battery of carbon dioxide absorbent oxygen release units 20, for instance filled with a carbon dioxide absorption agent such as potassium super oxide, or an equivalent which absorbs $CO_2$ and simultaneously regenerates or releases oxygen. The floor 18 is preferably porous and is supported by a rigid or solid horizontal panel 21 having a large vent opening 22 which can be opened or closed by a sliding closure door or panel 22a.

The reference numeral 24 denotes the floor of the space vessel and is about on the level of the floor portion 18 within the compression tube or cylinder 2.

The interior of the tube 2 contains separate independent oxygen generating means of the solid state, substantially conventional types indicated generally at 25, for supplying a life sustaining oxygen environment for an astronaut 26 within the compression tube or cylinder, which environment is separate and independent of the life sustaining environment within the space vessel 1, exteriorly of the compression tube 2. This oxygen generating system will be described subsequently in more detail. It is also independent and supplementary to the $CO_2$ absorbent oxygen release system 20 located below the floor 18.

As shown in the drawings, the compression tube or compartment 2 can function as an "air lock" to permit an astronaut to leave the space vessel 1 without disturbing the pressure or life sustaining environment within the vessel.

While it may be desirable to provide separate but coupled doors for the access and egress openings 4 and 5, as shown in FIGS. 1, 2 and 3, a single rotary cylindrical door or circular panel 27 may be provided for this purpose, being mounted within the cylindrical chamber on suitable guide and roller means (not shown) and provided with suitable air seals (not shown) between the outer surface of the closure 27 and the inner surface of the cylindrical chamber 2.

The length of the inner door opening 4, as shown, is much longer than the vertical length of the outer opening 5 which communicates with the passageway 6. The curved closure or door 27, therefore, is formed with a long closure portion 27a which closes the smaller opening 5, while the opening 4 is open, and also closes the opening 4 at which time the shorter portion 27b closes the shorter outside opening 5 and connecting passage 6.

Any suitable mechanical actuating means may be provided between the door 27 and the closure panel 22a, as indicated schematically at 28, arranged so that when the closure or door 27 is moved to close both of the openings 4 and 5 the venting panel 22a for the opening 22 communicating with the $CO_2$ oxygen release units 20 is moved to its open position, but when the door 27 is moved to uncover either one of the openings 4 or 5 the panel 22a is moved to close off the $CO_2$ absorbent compartment 19.

Referring to FIG. 6, one form of conventional actuating means 28 for moving the panel 22a between its open and closed positions, shown respectively in full and dotted lines, may comprise a bell crank 22b which is pivoted intermediate its ends to the floor 18 and having a long arm which is slotted at 22c at its outer end to engage a pin projecting from the slide panel closure 22a. The bottom portion of the rotary door 27 carries an inwardly projecting cam 22d which is located to engage and cam a push rod 22f that is slidably carried by the floor 18 when the door 27 is rotated to close both of the access openings 4 and 5.

A closure spring 22g urges the push rod 22f outwardly against the cam 22d and toward the inner periphery of the rotary door 27 when the cam 22d is moved by the rotary door 27 in either direction to open either of the inner or outer access openings 4 or 5 in the tube 2.

The inner end of the push rod 22f is connected by a link 22h to the short arm of the bell crank 22b.

The slide panel 22a is thus moved to full line position, as shown, to uncover the opening 22 by camming engagement of the cam 22d with the push rod 22f any time when the door 27 closes both of the access openings 4 and 5. Therefore, rotation of the door 27 in either direction to uncover either of the access openings 4 or 5 permits the spring 22g to rock the bell crank 22b to move the slide panel 22a to its dotted position and close the opening 22.

So that the astronaut's movements within the tube 2 will not be restricted, a space toilet 29 is provided which can be folded or lowered, for instance by manipulation of a handle 30, into an off-set compartment 31 provided in the inner wall of the tube for this purpose. As shown in FIG. 1, the off-set compartment is located below the smaller opening 5 and passageway 6, and is provided with a vertically slidable panel 32 for closing the off-set compartment when the toilet seat and bag are collapsed downwardly into the compartment 31.

It is also contemplated that this door or panel 32 may be mounted to slide in a recessed opening so as not to interfere with the rotary or other opening and closing movements of the closure means 27 for the two openings 4 and 5.

The improved complete emergency life sustaining system provides means usable during failure of the normal pressurization, or the life support system in a space craft and, as indicated above, may be used by an astronaut in the event of cabin decompression to permit his changing or removal of his uniform or his partial pressure suit, if wearing one, and donning a full pressure suit 17 stored above in compartment 13.

After entering the cylindrical chamber 2 and closing both door openings 4 and 5, the astronaut can energize the chlorate oxygen (dry state) candles, previously referred to at 25, and mounted in a plurality of closely spaced tubular receptacles 33 formed in and extending outwardly from the wall of the compression tube 2, as best seen in FIGS. 1 and 4.

These candles 25 are commercially available and well known items, each comprising a cartridge 25' containing the oxygen generating chlorate chemical composition having a firing primer cartridge 25a including an igniting charge.

As illustrated in FIGS. 4 and 5, the receptacles 33 are arranged in convenient reach of the astronaut 26 and may be fifteen, or even more in number, each receptacle 25 having a removable closure and igniter cap 34 also shown in perspective in FIG. 5 and in section in FIG. 4.

The caps 34 are removably secured across the outer ends of the chlorate cartridge receptacles 33 in any suitable manner, such as seen in FIG. 4 in which bayonet slots are provided in the flange 35 for engagement with the headed fasteners 36 so that upon slight rotation of the cap by the bail handle 37, it can be removed for insertion of a fresh chlorate cartridge 25 into the receptacle 33.

Each of the closure caps 34 is provided with an operating or oxygen candle firing button 38 at one side, a pressure relief valve 39 at the opposite side, preferably set at about 5 p.s.i. and a central oxygen delivery opening 40 through the cap having an outwardly extending sleeve portion constructed and shaped to receive the end or nipple of a conventional oxygen supply hose 42 for the astronaut's oxygen mask or helmet, depending which is used, some conventional suitable quick detachable connecting means being provided between the connecting sleeve and hose end nipple just mentioned; for example, a bayonet slot and pin connection means, so the astronaut can quickly make a positive connection with the receptacles 33 to receive oxygen therefrom when the button 38 is pressed.

The pressure relief valve 39 as shown may be provided with a closure spring 43 calibrated to vent pressure within the receptacle 33 in excess of 5 p.s.i. to the interior of the compression tube or chamber and thus supply the interior of the compression tube 2 with a life sustaining environment which is separate and independent of the environment exteriorly of the tube. This arrangement also permits the astronaut to change into a full pressure suit and associated equipment when necessary, for instance upon decompression in the space vessel, after which the openings 4 or 5 can be opened and the astronaut can leave the chamber and connect his oxygen supply hose to the space vessel's conventional oxygen supply system, if the same is operative, or to his emergency oxygen supply bottle if his suit is provided with an emergency oxygen supply.

One means carried by the cap 34 for igniting the oxygen candle generating means is shown in FIG. 4 and comprises a pivoted lever or hammer 44 which is rotated by a spring 45 when released by a latch lever 46, the lever being moved by the firing button 38 to free or release the hammer lever 44. The hammer 44 may be provided with a firing pin 47 for striking and firing the primers 25a of the oxygen candles.

I claim:
1. In combination with an outer space vessel having convenitional means to provide a life sustaining environment therein during flight in outer space, a one man elongated compression chamber fixed in said vessel adjacent one side thereof having a personnel access opening therein opening into the interior of the vessel, closure means for closing said access opening to seal the interior of said chamber from the interior of said vessel, said chamber having a floor therein formed with a vent opening therethrough into said chamber above said floor, closure means for closing said vent opening, operating means connected between said access opening closure means and said vent opening closure means operable to open said vent opening closure means when said access opening closure means is moved to close said access opening and close said vent opening when said access opening closure means is moved to open said access opening, and a battery of $CO_2$ absorbent and oxygen generating means fixed in said chamber below said flood for absorbing $CO_2$ from an astronaut confined in said chamber and generating oxygen and venting the same through said vent opening to provida a life sustaining environment chamber independent of the environment within said vessel, exterior of said chamber, when said access opening is closed.

2. A combination as expressed in claim 1, including a plurality of separate independent solid state oxygen generating candle units fixed in the wall of said chamber having manual means for selectively igniting the same for oxygen generation from within the chamber, for pressurizing said chamber with oxygen to a predetermined life sustaining and pressure environment independently of the environment exteriorly of said chamber, including means for selectively connecting thereto a conventional oxygen supply hose for an astronaut in said chamber for supplying oxygen to a helmet or oxygen mask of a partial pressure suit worn within said chamber containing the astronaut, whereby upon decompression of the interior of the space vessel an astronaut therein can enter and close said chamber to remove his partial pressure suit and put on a full pressure suit and open said access opening, re-enter the interior of the vessel, and establish connection with the conventional oxygen supply system of the space vessel.

3. A vertical cylindrical compression tube for space vessels comprising a pressure tight cylinder closed at both ends having an access opening in one side thereof to permit an astronaut to enter the interior of the tube, closure door means operable exteriorly and interiorly of the tube for closing and sealing said access opening, a supporting floor for the astronaut disposed horizontally in spaced relation above the bottom of the tube having a vent opening therethrough into said tube above said floor, closure means for said vent opening, an operating connection between said closure door for said access opening and said closure means for closing said vent opening when said access opening is opened, and opening said vent opening when said access opening is closed, and $CO_2$ absorbent oxygen generating means fixed in said tube below said floor for absorbing $CO_2$ from an astronaut in said tube and releasing oxygen through said vent opening to provide a life sustaining environment in said tube when said access opening is closed and said vent opening is open.

4. A compression tube as claimed in claim 3 including storage compartment in the top of said tube adapted to contain a full pressure suit which is accessible to an astronaut within said tube, separated independent oxygen generating candle receptacles formed in the wall of the tube between said floor and said storage compartment, each adapted to receive a separate oxygen generating candle, closure means for each receptacle having an oxygen outlet opening adapted to receive and connect a conventional oxygen supply hose for an astronaut's mask or helmet, and an oxygen relief valve in each receptacle for supplying oxygen in excess of about 5 p.s.i., generated in said receptacles by said oxygen candles, into the interior of the tube to pressurize the interior of the tube with oxygen to provide a life sustaining environment in the tube to permit the astronaut to put on a full pressure suit while in said tube, and leave the tube through said access opening, and manual means for selectively igniting said oxygen candles to initiate the oxygen generating operation thereof.

References Cited by the Examiner
UNITED STATES PATENTS

| | | | |
|---|---|---|---|
| 953,473 | 3/1910 | Labowsky | 114—16 |
| 3,148,034 | 9/1964 | Bovard et al. | 128—191 |
| 3,158,123 | 11/1964 | Froehlich | 114—16 |

FERGUS S. MIDDLETON, *Primary Examiner.*